A. L. BRADLEY.
VALVE TESTER.
APPLICATION FILED JAN. 17, 1921.
1,402,139.
Patented Jan. 3, 1922.
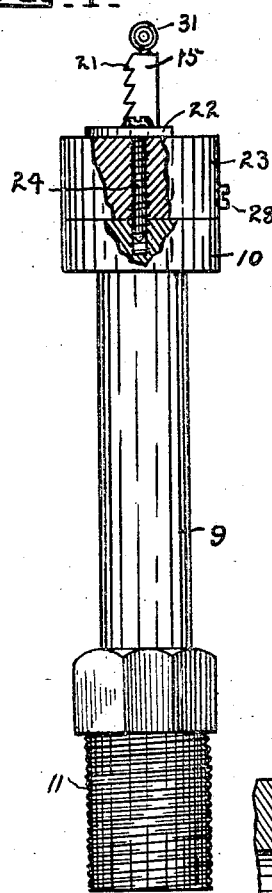
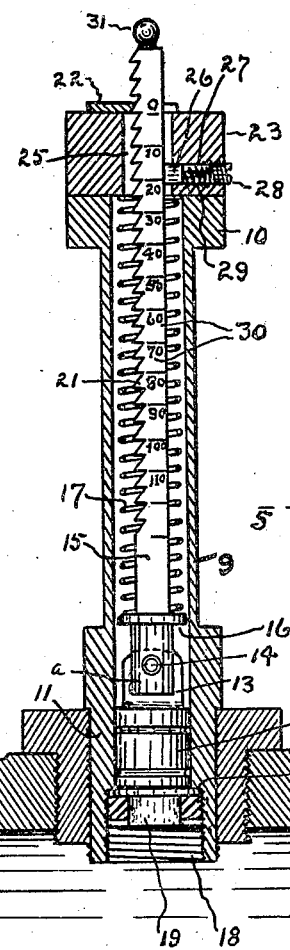
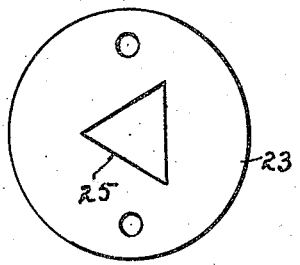
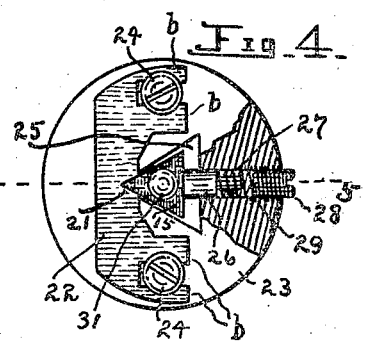
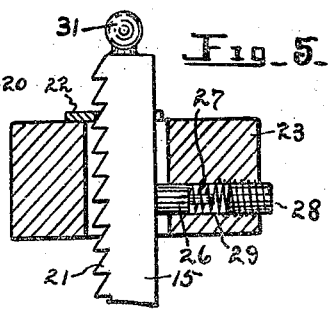
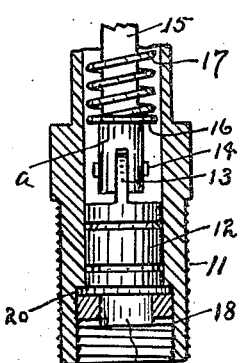
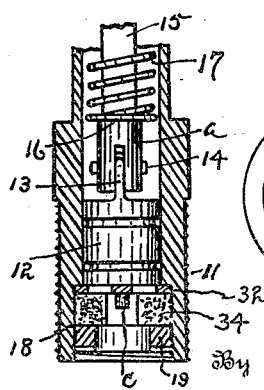
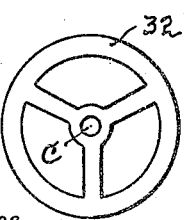
Inventor
Arthur L. Bradley
By Hiram A. Sturges
Attorney

UNITED STATES PATENT OFFICE.

ARTHUR L. BRADLEY, OF COUNCIL BLUFFS, IOWA.

VALVE TESTER.

1,402,139.　　　　　Specification of Letters Patent.　　Patented Jan. 3, 1922.

Application filed January 17, 1921. Serial No. 437,711.

*To all whom it may concern:*

Be it known that I, ARTHUR L. BRADLEY, a citizen of the United States, residing at Council Bluffs, in the county of Pottawattamie and State of Iowa, have invented certain new and useful Improvements in a Valve Tester, of which the following is a specification.

This invention relates to a pressure gage useful for testing the pressure in engine cylinders such as the cylinders of internal combustion engines so as to detect leakage around the pistons or valves of internal combustion engines, and has for its object, broadly, to provide a pressure gage which may be readily inserted in the threaded opening usually occupied by a spark plug and which will accurately register the degree of pressure. The invention includes a spring which may be conveniently retracted after each operation and means for maintaining the indicator-bar in its extended position so that it may be conveniently inspected, together with certain adjustable features found to be of advantage. Other objects of the invention will be explained hereinafter.

The invention consists of the novel construction, combination and arrangement of parts as described herein and claimed, and as illustrated in the accompanying drawing, wherein,—

Fig. 1 is a side view of the pressure gage partly in section. Fig. 2 is a view of the same in longitudinal section. Fig. 3 is a plan view of an adjusting-cap, the scale being enlarged. Fig. 4 is a top plan view of the device on an enlarged scale, a part being in section to show a resiliently mounted plunger. Fig. 5 is a sectional view on line 5—5 of Fig. 4. Fig. 6 shows the lower part or base of the device, being a view taken at right-angles to the view shown in Fig. 2. Fig. 7 illustrates a packing-ring and a metallic washer used in connection with the device for testing the degree of air-pressure of pneumatic tires. Fig. 8 is a bottom plan view of the metallic washer.

Referring now to the drawing for a more particular description, the pressure gage consists, in part, of a comparatively short tube or hollow cylinder 9 having a boss 10 formed on its upper end and having a threaded lower end or base 11 adapted to be mounted in the aperture of an engine cylinder, said aperture being ordinarily used for mounting a spark-plug therein; and in operation, when testing a valve of a cylinder to ascertain the degrees of leakage, a spark-plug is removed from its aperture for receiving the base 11.

Numeral 12 indicates a piston for the cylinder, said piston being provided with an ear 13 upon which is pivotally mounted as indicated at 14, the base $a$ of an indicating-bar 15, said bar preferably being triangular in cross-section.

Upon the base $a$ of the bar 15 is mounted a metallic washer 16 which supports a spiral spring 17, said spring encircling the bar 15 and being depended upon for resisting an outward movement of the piston and said bar.

Numeral 18 indicates a circular chamber opening upon the lower end of the base 11, its wall being threaded for a mounting of a screw ring 19 which may be inserted after the piston has been placed within the cylinder, a flexible washer 20 being disposed between these metallic parts to prevent undue vibration.

One of the longitudinal edges of the bar 15 is provided with teeth 21, and at 22 is indicated a catch-member or plate which is secured to the top of the adjusting-cap 23 by a pair of screws 24 in such a manner that its inner edge will be disposed in the line of movement of the teeth 21 when the bar moves outwardly.

As best shown in Figs. 3 and 4, the cap 23 is provided with a recess 25 which is triangular in plan, which operates as a guide for the bar 15, said recess or opening being of such area that the bar may have a limited rocking movement for engaging with and disengaging its teeth from the plate 22, the pivotal mounting 14 also permitting the rocking movements of said bar.

For operation, a lubricant is generally placed in the cylinder so that the piston will run smoothly and to effect sealing of the piston, and hydrocarbon or other fluid element under pressure within the cylinder will cause the piston and bar 15 to slide outwardly against the force of the spring, said bar being caught and maintained in its extended position by means of the plate 22 which engages the teeth 21, a plunger 22 being employed and pressed against the flat surface of the bar opposite to said teeth, by a small spring 27, said spring 27 being disposed between the plunger and a set-screw

28, these particular parts being disposed in an aperture 29 formed in the adjusting-cap 23.

The functions discharged by the several parts will be apreciated by users of the device since the maintenance mentioned for the bar 15 in its extended position permits an examination to be conveniently made of the numerals 30 which are provided for said bar, to ascertain the degree of pressure. To permit retraction of the spring 17, the bar may be manually pressed transversely against the force of the spring 27, a thumb-piece or ball 31 being shown for this purpose, the bar moving inwardly to its normal position.

The plate 22 is provided, near its ends, with prongs b, these being arranged in pairs and adapted to be engaged by the heads of the screws 24, and therefore the plate may be adjusted to permit suitable engagement with the teeth 21, should the teeth or plate become unduly worn.

Figs. 7 and 8 illustrate the use of a metallic washer 32 provided centrally with a projection c and which may be substituted for the washer 20, also a packing-ring 34 preferably constructed of rubber may be employed, said parts being useful for certain purposes, as for testing the degree of air pressure in pneumatic tires.

While I have described construction in detail, I do not wish to be understood as limiting myself in this respect, and changes in form, size, proportion and minor details may be made, as found to be of advantage without departing from the spirit of the invention, said changes to be determined by the scope of the invention as claimed.

I claim:

1. A valve tester comprising a hollow cylinder having a terminal boss and having a base provided with exterior and interior threads, a screw-ring adapted to engage the interior threads of said base, a cap removably mounted on said boss and having an aperture triangular in plan communicating with the interior of the cylinder, a catch-plate on said cap, a piston between the screw-ring and said cap, an indicating-bar triangular in cross-section provided with teeth and pivotally connected with the piston and extending beyond said cap, a spring between the piston and said cap, and resilient means tending to press the teeth of the indicating-bar into engagement with the catch-plate.

2. In a valve-tester, the combination of a hollow cylinder, a cap mounted upon one of the ends and having an aperture formed angular in plan communicating with the interior of the cylinder, a catch-plate mounted upon said cap and having a part disposed in the plane of said angular aperture, a piston within the cylinder, an indicating-bar of angular form in cross-section provided with teeth and pivotally connected with the piston and extending beyond said cap, a spring within the cylinder between the cap and said piston, a plunger, and a resilient member engaging the plunger for pressing said plunger and the teeth of the indicating-bar toward the catch-plate.

3. In a valve-tester, a hollow cylinder having a part of its aperture formed angular in plan, a piston within the cylinder, an indicating-bar provided with teeth and of angular form in cross-section pivotally connected with the piston and extending beyond one of the ends of the cylinder, a spring within the cylinder normally resisting a movement of the piston, a catch-plate on the cylinder, and a resiliently mounted plunger in engagement with the indicating-bar for causing engagement of the teeth of said bar with the catch-plate.

4. A valve-tester comprising, in combination, a hollow cylinder having a part of its aperture formed angular in plan, a piston disposed within the cylinder, an indicating-bar provided with teeth and having an angular form in cross-section, said bar being mounted upon the piston and traversing the angular part of the aperture of the cylinder, resilient means within the cylinder tending to resist a movement of the piston, a catch-plate adjustably mounted upon the cylinder and having a part disposed in the plane of the angular aperture thereof, a plunger pressed against the indicating-bar for causing engagement of the teeth of said bar with the catch-plate, and means for adjusting the degree of pressure of the plunger upon said indicating-bar.

In testimony whereof, I have affixed my signature in presence of two witnesses.

ARTHUR L. BRADLEY.

Witnesses:
 HIRAM A. STURGES,
 ARTHUR H. STURGES.